United States Patent
Ripley et al.

(10) Patent No.: US 8,023,909 B2
(45) Date of Patent: Sep. 20, 2011

(54) DATA CONVERSION USING A SERIAL INTERFACE CLOCK IN A POWER AMPLIFIER MODULE

(75) Inventors: David S. Ripley, Cedar Rapids, IA (US); James H. Ross, Cedar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 432 days.

(21) Appl. No.: 12/352,066

(22) Filed: Jan. 12, 2009

(65) Prior Publication Data
US 2010/0178960 A1   Jul. 15, 2010

(51) Int. Cl.
*H04B 1/04* (2006.01)
(52) U.S. Cl. .......................... 455/126; 375/297
(58) Field of Classification Search .............. 455/126, 455/114.3, 115.1, 127.1, 108; 375/296, 297
See application file for complete search history.

(56) References Cited

U.S. PATENT DOCUMENTS

| | | | |
|---|---|---|---|
| 2008/0233904 A1* | 9/2008 | Suzuki et al. | 455/126 |
| 2010/0120384 A1* | 5/2010 | Pennec | 455/126 |

* cited by examiner

*Primary Examiner* — Tu Nguyen
(74) *Attorney, Agent, or Firm* — Knobbe Martens Olson & Bear LLP

(57) ABSTRACT

In a mobile wireless telecommunication device, a bidirectional serial interface is used to transfer a digital representation of an analog value from a first chip associated with a power amplifier module to a second chip. In an exemplary embodiment, circuitry on the first chip receives this clock signal from the second chip during the address portion of a read operation and uses this clock signal to generate a conversion clock signal. An analog-to-digital converter (ADC) on the first chip operates in response to the conversion clock signal to convert an analog value to a digital output. Circuitry on the first chip then transfers the digital output of the ADC from the first chip to the second chip via the serial interface.

15 Claims, 4 Drawing Sheets

US 8,023,909 B2

DATA CONVERSION USING A SERIAL INTERFACE CLOCK IN A POWER AMPLIFIER MODULE

BACKGROUND

Radio frequency (RF) transmitters of the type used in mobile wireless telephones (also known as cellular telephones) and other portable radio transceivers commonly include transmit power control circuitry that adjusts the power of the transmitted RF signal. The power control circuitry can adjust a power amplifier to increase or decrease the transmitted RF power. Adjusting transmitted RF power is useful for several purposes. For example, in many types of cellular telecommunications systems, it is useful for transmitted RF power to be higher when the transceiver (also referred to as a handset) is farther from the nearest base station and lower when the transceiver is closer to the nearest base station. Also, in some types of multi-mode (e.g., dual-mode) transceivers, such as those that are capable of operating in accordance with both the GSM (Global System for Mobile telecommunication) standard and EDGE (Enhanced Data rates for GSM Evolution) standard, requirements for transmitted RF power differ depending on whether the transceiver is operating in GSM mode or EDGE mode. Similarly, requirements for transmitted RF power can differ in multi-band (e.g., dual-band) transceivers, such as those that are capable of operating in both a GSM "low band" frequency band and a GSM "high band" frequency band. To accommodate different power amplification requirements for multiple bands, the power amplifier system of the transceiver may correspondingly include multiple power amplifiers.

At least some of the above-referenced transmit power control circuitry is commonly located on an integrated circuit chip or die other than that on which the one or more power amplifiers are located. For example, while the power amplifiers may be located on a chip that is part of a stand-alone or dedicated power amplifier module, the portion of the transmit power control circuitry that generates the gain, bias or other power control signals to be provided as inputs to the power amplifiers may be embodied in processing logic (e.g., of a programmed processor chip) and other circuitry that is part of a baseband circuitry module or a mixed-signal circuitry module. In a complex transmitter, such as a multi-mode, multi-band transmitter having several power amplifiers, there can be a significant number of electrical connections or signal lines that convey the power control signals from the power control circuitry to the power amplifier module. For a number of reasons, it is desirable to minimize the number of such power control signal lines.

SUMMARY

Embodiments of the invention relate to using a bidirectional serial interface to transfer a digital representation of an analog value from a first chip of a type that processes radio frequency (RF) signals, such as a chip associated with a power amplifier module or front end module, to a second chip in a mobile wireless telecommunication device. The serial interface is of a type that provides a clock signal only during a data transfer operation, i.e., during a read or write operation, and not at other times. In an exemplary embodiment, circuitry on the first chip receives this clock signal from the second chip during the address portion of a read operation and uses this clock signal to generate a conversion clock signal. An analog-to-digital converter (ADC) on the first chip operates in response to the conversion clock signal to convert an analog value to a digital output.

Circuitry on the first chip then transfers the digital output of the ADC from the first chip to the second chip via the serial interface.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1:
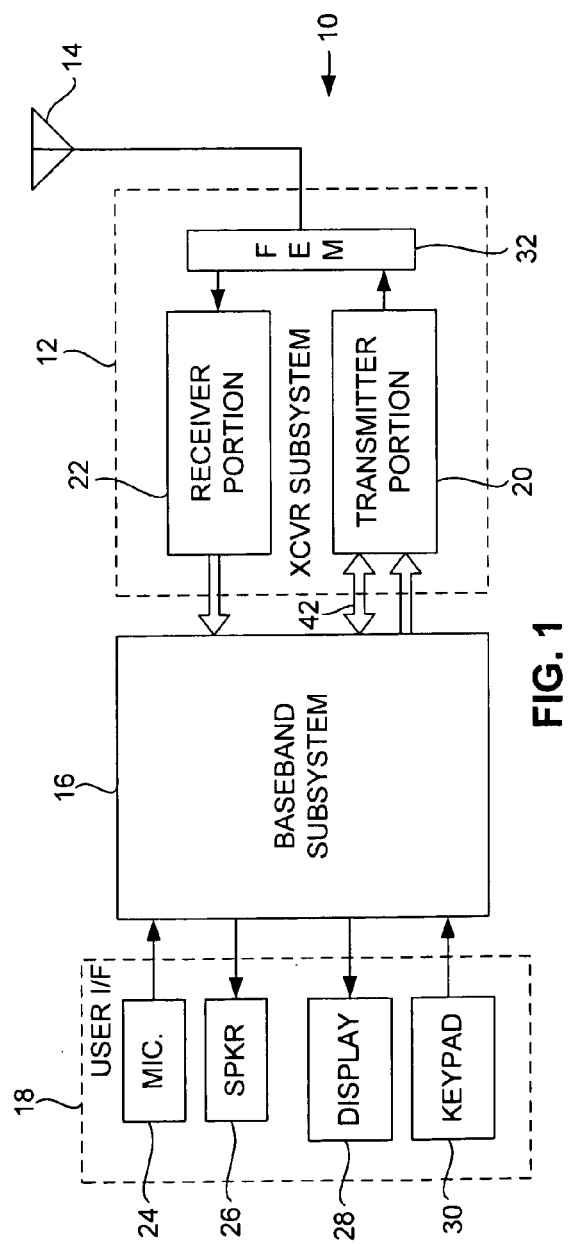
FIG. 1 is a schematic diagram illustrating a mobile wireless telephone, in accordance with an exemplary embodiment of the present invention.

As illustrated in FIG. 1, in accordance with an exemplary embodiment of the invention, a mobile wireless telecommunication device 10, such as a cellular telephone, includes a radio frequency (RF) transceiver subsystem 12, an antenna 14, a baseband subsystem 16, and a user interface section 18. Transceiver subsystem 12 includes a transmitter portion 20 and a receiver portion 22. User interface section 18 includes a microphone 24, a speaker 26, a display 28, and a keyboard 30, all coupled to baseband subsystem 16. The output of transmitter portion 20 and the input of receiver portion 22 are coupled to antenna 14 via a front-end module (FEM) 32 that allows simultaneous passage of both the transmitted RF signal produced by transmitter portion 20 and the received RF signal that is provided to receiver portion 22.

Figure 2:
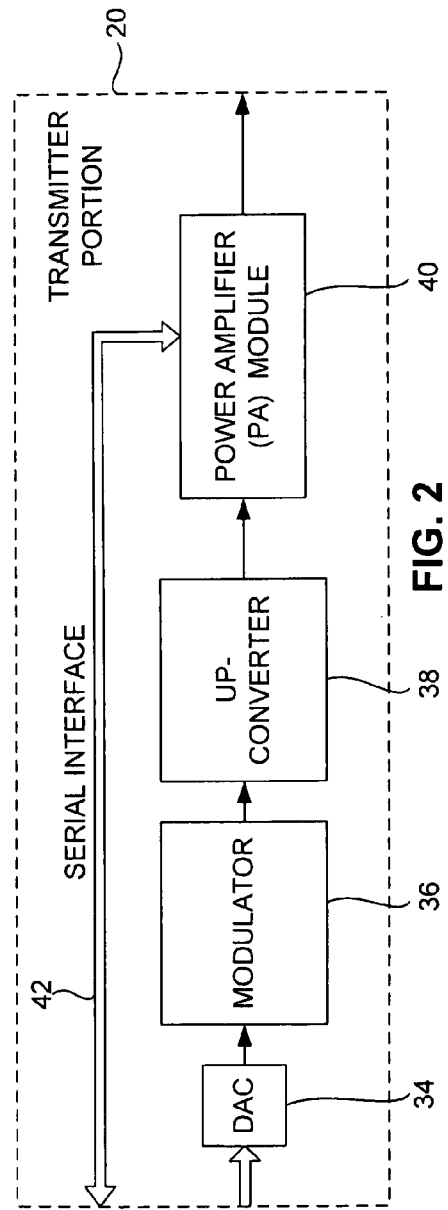
FIG. 2 is a block diagram illustrating the transmitter portion of the mobile wireless telephone shown in FIG. 1.

As illustrated in FIG. 2, a digital-to-analog converter 34 in transmitter portion 20 receives a digital signal that is input to transmitter portion 20 and converts it to an analog signal. A modulator 36 modulates the analog signal and provides the modulated signal to an upconverter 38. Upconverter 38 shifts or upconverts the frequency of the modulated signal from a baseband frequency to a transmit frequency and provides the upconverted signal to a power amplifier module 40.

Power amplifier (PA) module 40 can comprise one or more integrated circuit chips, packaged together or otherwise assembled into a modular device. Likewise, baseband subsystem 16 can comprise one or more chips, packaged together or otherwise assembled into a modular device. Such modularity is desirable for several reasons that are well understood by persons skilled in the art. However, such modularity can present challenges to interfacing a module to another module or element.

Figure 3:
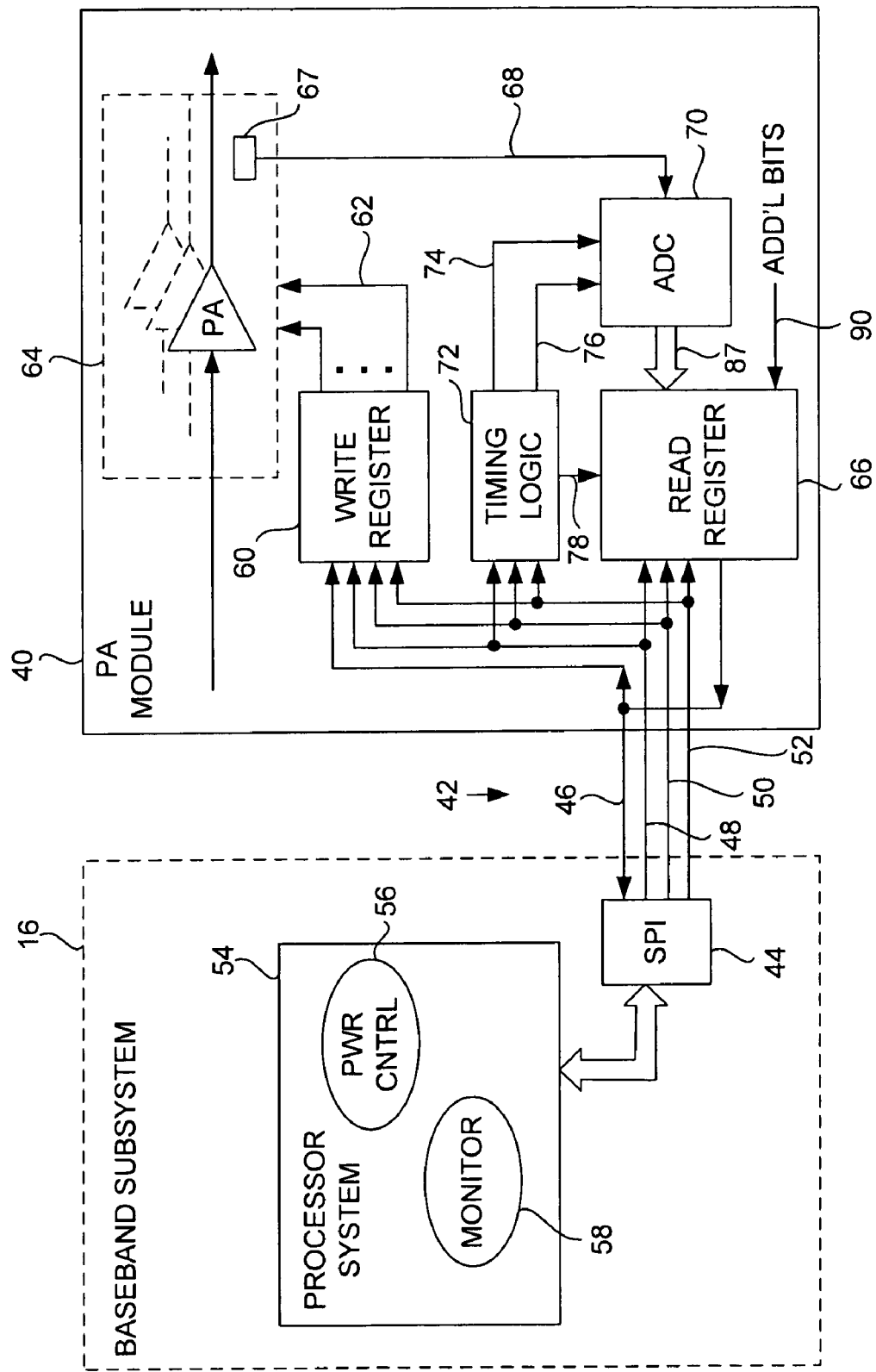
FIG. 3 is a block diagram illustrating the baseband subsystem and power amplifier module shown in FIG. 2, where a digital representation of an analog value can be transferred from the power amplifier module to the baseband subsystem via the serial interface.

As illustrated in FIGS. 2 and 3, a serial interface 42, such as the well-known Serial Peripheral Interface (SPI), is included for bidirectionally transferring data in serial digital format between PA module 40 and SPI logic 44 (FIG. 3) in baseband subsystem 16. As described below in further detail, data that is transferred from baseband subsystem 16 to PA module 40 can include data relating to amplifier power control. Furthermore, and importantly with regard to the present invention, data that is transferred from PA module 40 to baseband subsystem 16 can include digital representations of analog values. As described in further detail below, such data can include values measured in PA module 40, such as a temperature, a power supply voltage, an average RF output voltage, etc.

SPI logic 44 defines or governs the operation of serial interface 42. In an embodiment of the invention such as that illustrated herein, in which serial interface 42 is the well-known Serial Peripheral Interface, SPI logic 44 operates in accordance with the well-established SPI protocol. As known in the art, an SPI data transfer operation, which can be either a read operation or a write operation, includes an address portion (16 address bits in this embodiment), which includes a bit designated to signify whether the transfer is a write or a read, followed by a data portion (16 bits in this embodiment). In accordance with the SPI protocol, serial interface 42 includes four signal lines: a data signal line 46; a transfer clock signal line 48; an enable signal line 50; and a reset ("resetf") signal line 52 (which can be omitted in other embodiments). Although referred to as a "data" signal line, in accordance with the SPI protocol, data signal line 46 carries address bits during the address portion of a data transfer and data bits during the data portion of a data transfer.

A processor system 54 in baseband subsystem 16 can initiate the data transfers and otherwise process the data. For example, suitably programmed with software or firmware so as to define power control logic 56, processor system 54 can send power control data to PA module 40 via SPI logic 44 and serial interface 42. Likewise, suitably programmed with software or firmware so as to define monitor logic 58, processor system 54 can receive values measured in PA module 40 via serial interface 42 and SPI logic 44. Although such details are not shown for purposes of clarity, processor system 54 can comprise any suitable combination of processors, memory and other devices. Although in the exemplary embodiment a suitably programmed processor system 54 processes the data that is transferred to and from PA module 40, in other embodiments any other suitable logic, including any other suitably programmed or configured combination of hardware, software, firmware, etc., can similarly process the data.

At system power-on, reset line 52 is held low, placing the device in a reset state. Reset signal line 52 ("resetf", which is an active-low signal) is then transitioned high to enter normal operating mode. To transfer data to PA module 40, i.e., to perform a write operation, in accordance with the SPI protocol, SPI logic 44 asserts the enable signal on signal line 50, and produces a clock signal on transfer clock signal line 48. During the first 16 transfer clock cycles, known as the address portion of the write operation, SPI logic 44 produces address bits on data signal line 46. Then, SPI logic 44 produces data bits on data signal line 46 during another 16 transfer clock cycles, known as the data portion of the write operation. A write register 60 in PA module 40 responds to the address, data bits, enable and clock signals by storing or latching the data bits. Following the data portion of the write operation, SPI logic 44 ceases to produce the transfer clock signal. The latched data bits 62, which can represent, for example, power control information, are provided to one or more power amplifiers 64 to adjust various amplifier parameters. As power amplifiers 64 can be conventional single or multi-stage devices of the type commonly included in mobile wireless telecommunication devices, they are not described herein in further detail. Note that some embodiments of the SPI protocol may provide for more than 16 bits and others less than 16 bits, and not all provided data bits need be used.

To transfer data from PA module 40, i.e., to perform a read operation, in accordance with the SPI protocol, SPI logic 44 asserts the enable signal on enable signal line 50, and produces a clock signal on transfer clock signal line 48. During the the address portion of the read operation, SPI logic 44 produces address bits on data signal line 46. Then, SPI logic 44 deasserts the enable signal on enable signal line 50. A read register 66 responds to the address, enable and clock signals by providing data bits that may be stored in read register 66. That is, such data bits are transferred from read register 66 to SPI logic 44 during another 16 transfer clock cycles, i.e., the data portion of the read operation. Following the data portion of the read operation, SPI 44 ceases to produce the transfer clock signal. Note that in the illustrated embodiment of the SPI protocol, the enable signal transitions low after transfer of the address bits only on a read operation; the enable signal remains high during the data portion of a write operation. After the data bits are transferred, processor system 54, operating in part under control of monitor logic 58, can process the received data bits in any suitable manner.

Although any suitable data can be read from PA module 40 in above-described manner, the present invention relates to data that represents an analog value. A suitable sensor or sensing circuit 67 can provide the analog value. For example, sensing circuit 67 can measure an operating temperature of one or more of power amplifiers 64 and provide the measured analog value on an analog signal line 68. Alternatively, for example, sensing circuit 67 can be of a type that measures a voltage (e.g., an average, root-mean-square, etc.) that is output by one or more of power amplifiers 64. In still other embodiments, sensing circuit 67 can be of a type that measures the supply voltage provided to power amplifiers 64. As described in further detail below, such an analog value is converted to a digital representation and transferred via serial interface 42.

A characteristic of SPI and similar serial interface protocols is that a clock signal is only produced during a data transfer. As generating a clock signal on an RF chip can give rise to spurious signals that could adversely affect RF performance, it has been recognized in accordance with the present invention that the limited-duration SPI transfer clock can be used advantageously to briefly drive an analog-to-digital converter (ADC) 70 in PA module 40. As described in further detail below, an analog value can be converted to a digital representation and transferred within the span of a single read operation, thereby obviating generating a separate clock signal on PA module 40. Although in the exemplary embodiment data is transferred in accordance with the SPI protocol, in other embodiments data can be transferred in any other suitable manner.

Timing logic circuitry 72 in PA module 40 responds to the transfer clock signal, enable signal and reset signal by generating a conversion enable signal 74, a conversion clock signal 76, and a data latch signal 78 that control ADC 70 and read register 66. Conversion enable signal 74 and conversion clock signal 76 are provided to ADC 70. Data latch signal 78 is provided to read register 66.

Figure 4:
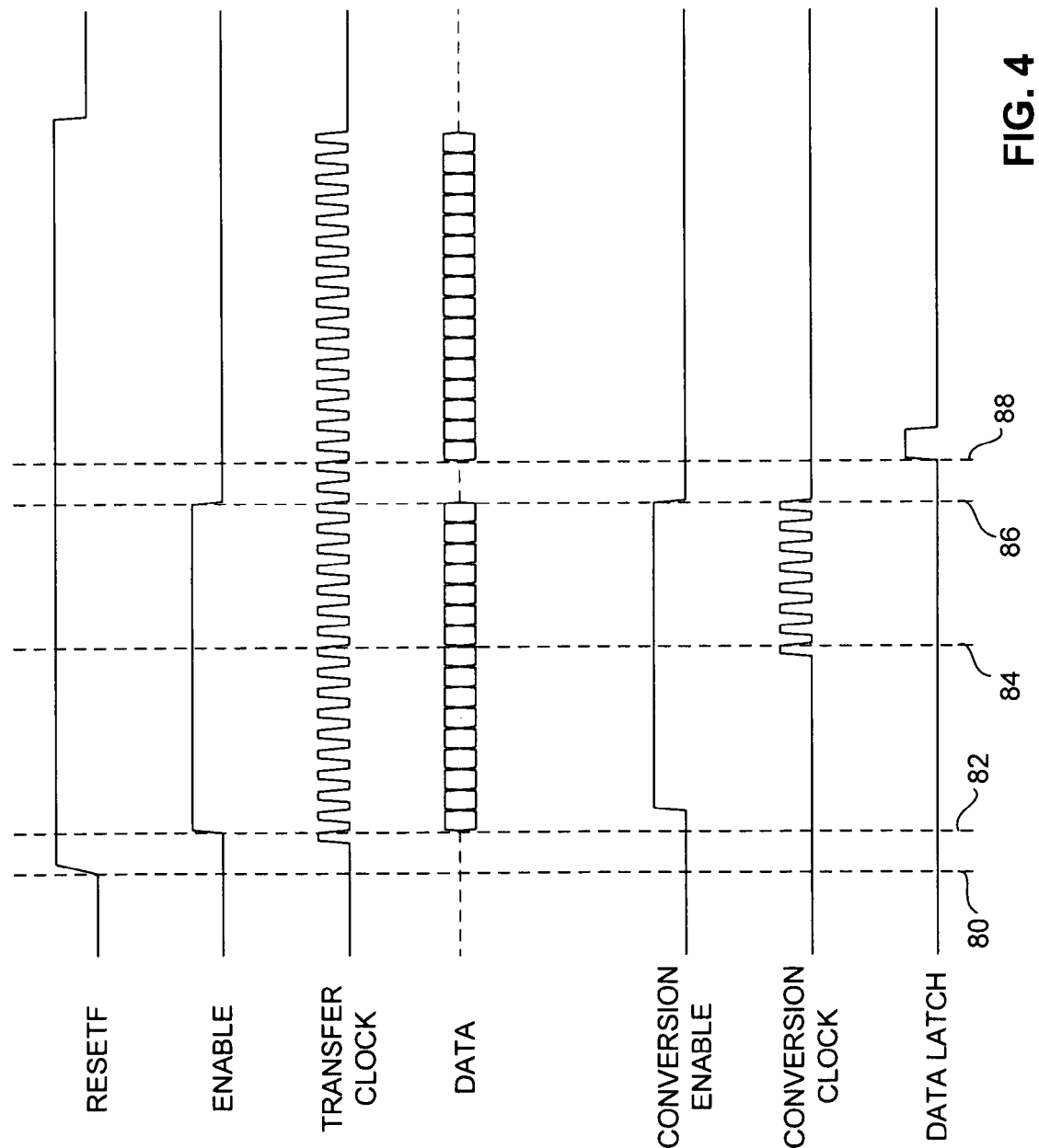
FIG. 4 is a timing diagram illustrating signals involved in an analog-to-digital conversion process in the power amplifier module shown in FIG. 3.

As illustrated by the timing diagram of FIG. 4, at time 80 SPI logic 44 (FIG. 3) asserts the reset signal ("resetf") at system power-on, and at time 82 asserts the enable and transfer clock signals. During the 16 clock cycles following time 82, SPI logic 44 provides 16 address bits. Timing logic circuitry 72 responds to the transfer clock signal by asserting conversion enable signal 74. Timing logic circuitry 72 also counts the transfer clock cycles and asserts the conversion clock at time 84, i.e., after delaying a predetermined number of clock cycles. Timing logic circuitry 72 delays that predetermined number of clock cycles to allow bias settling in ADC 70 or for ADC 70 to otherwise stabilize before initiating conversion. In the illustrated embodiment, for example, timing logic circuitry 72 delays seven clock cycles. Although such a delay is included in the illustrated embodiment, in other embodiments conversion can be initiated at any suitable time during the read operation. Timing logic circuitry 72 asserts or actives the conversion clock for a predetermined number of clock cycles that is sufficient to achieve conversion. In the illustrated embodiment, for example, timing logic circuitry 72 asserts the conversion clock for eight clock cycles. ADC 70 can be based upon the well-known successive approximation register (SAR) ADC architecture. As well understood in the art, such a device can convert an analog value to a digital representation at eight bits of resolution in eight clock cycles. Thus, at time 86 the output 87 of ADC represents the analog value. As time 86 also marks the end of the address portion of the read operation, SPI logic 44 (FIG. 3) deasserts the enable signal. In response, timing logic circuitry 72 deasserts conversion enable signal 74 and conversion clock signal 76. Lastly, timing logic circuitry 72 asserts data latch signal 78 to latch the output 87 of ADC 70 into read register 66.

Once latched into read register 66, the bits representing the analog value can be serially transferred to processor system 54 via SPI logic 44 in the manner described above, during the data portion of the read operation, which begins at time 88. In addition to the bits representing the analog value, any suitable number and type of additional bits 90 can also be latched into read register 66 and transferred.

Processor system 54, operating in part under control of monitor logic 58, can then process the received data bits in any suitable manner. For example, if monitor logic 58 determines that a measured temperature in PA module 40 exceeds a predetermined threshold, monitor logic 58 can cause a remedial action to be taken, such as reducing power amplifier output power.

Figure 5:
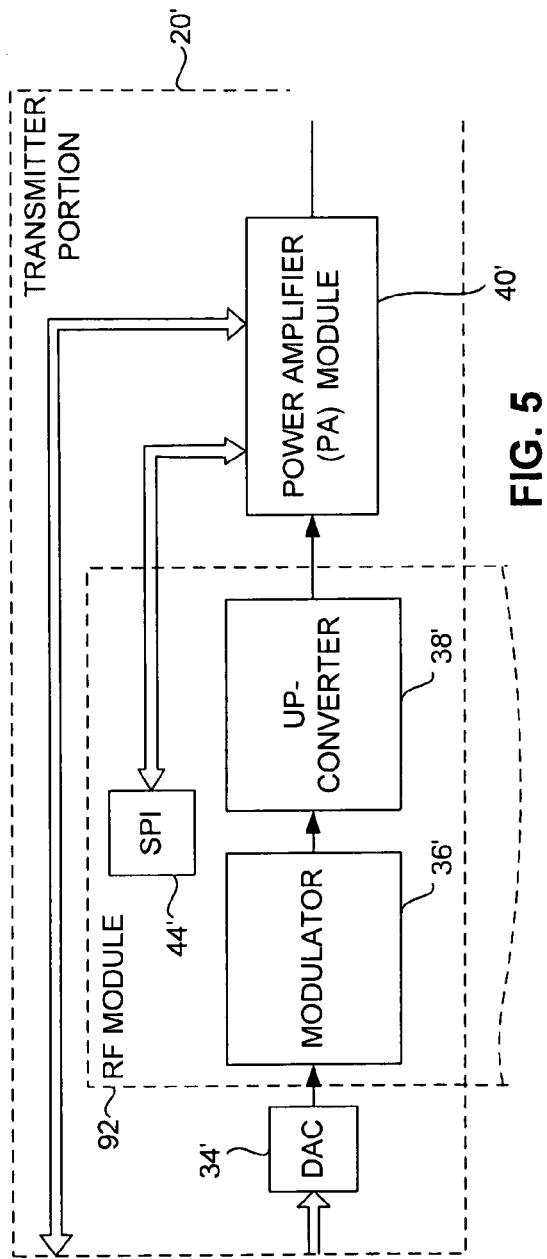
FIG. 5 is a block diagram similar to FIG. 2, illustrating a transmitter portion in accordance with an alternative exemplary embodiment.

As illustrated in FIG. 5, in an alternative embodiment, the bits representing the analog value are transferred from a PA module 40' to an RF module 92 rather than to baseband subsystem 16 as in the above-described embodiment. Accordingly, SPI logic 44 is included in RF module 92 rather than baseband subsystem 16. The analog-to-digital converter, timing logic circuitry and read register associated with this alternative embodiment are not shown for purposes of clarity but are included in PA module 40' in essentially the same manner as in the above-described embodiment.

Figure 6:
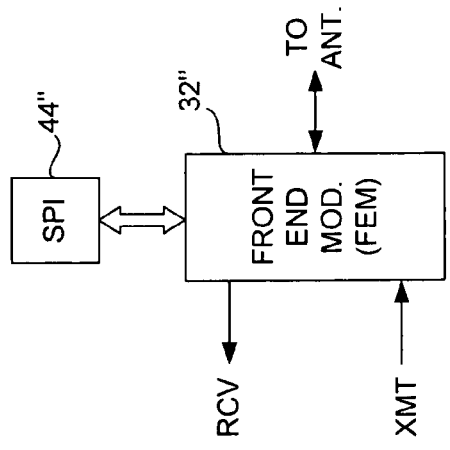
FIG. 6 is a block diagram illustrating a front end module of a mobile wireless telephone, where a digital representation of an analog value can be read from the front end module via the serial interface, in accordance with another alternative exemplary embodiment.

As illustrated in FIG. 6, in another alternative embodiment, analog-to-digital conversion occurs in a front end module (FEM) 32" similar to FEM 32 in the above-described embodiment. The analog-to-digital converter, timing logic circuitry and read register associated with this alternative embodiment are not shown for purposes of clarity but are included in FEM 32" in essentially the same manner as that in which they are included in PA module 40 in the above-described embodiment. The associated SPI logic 44" can be included in any suitable element, such as a baseband subsystem, RF module, etc. (not shown in this embodiment for purposes of clarity).

It should be noted that although the embodiments illustrated with regard to FIGS. 3, 5 and 6 are described separately, their features can be combined in any suitable manner in still other embodiments. For example, embodiments can include multiple analog-to-digital converters and associated circuitry of the type described above, distributed among various elements of the mobile wireless telecommunication device, of which power amplifier modules and front end modules are examples. Thus, analog values can transferred or read from any of various elements of the mobile wireless telecommunication device using the same serial interface as that through which values are transferred or written to such elements.

As illustrated through the above-described exemplary embodiments, a serial interface clock received from a second chip can be used advantageously to drive an analog-to-digital converter on an RF first chip during a serial interface read operation. As the clock is not active at times other than during the read operation (or a write operation), there is no continuously active clock signal to potentially give rise to spurious signals that could adversely affect RF operations on the first chip. Also, as there is no analog-to-digital conversion clock generation circuitry on the PA module or other first chip from which data is to be transferred, die (chip) area and current consumption are economized.

While various embodiments of the invention have been described, it will be apparent to those of ordinary skill in the art that many more embodiments and implementations are possible that are within the scope of this invention. Accordingly, the invention is not to be restricted except in light of the following claims.

What is claimed is:

1. In a radio frequency (RF) first chip associated with a power amplifier module of a mobile wireless telecommunication device, a circuit for using a bidirectional serial interface to transfer a digital representation of an analog value, the serial interface providing a transfer clock signal only during a data transfer operation, the data transfer operation having sequential address and data portions, the circuit comprising:
    a timing circuit, the timing circuit receiving the transfer clock signal from a second chip of the mobile wireless telecommunication device during a read operation and generating a conversion clock signal in response to the transfer clock signal during an address portion of the read operation;
    an analog-to-digital converter (ADC), the ADC converting the analog value to a digital output in response to the conversion clock signal during the address portion of the read operation; and
    an output circuit, the output circuit transferring the digital output of the ADC to the second chip via the serial interface during a data portion of the read operation.

2. The circuit claimed in claim 1, wherein the timing circuit generates the conversion clock signal after delaying a predetermined number of clock cycles from a beginning of the transfer clock signal to promote stabilization of the ADC before conversion.

3. The circuit claimed in claim 1, wherein the timing circuit further generates a conversion enable signal in response to the transfer clock signal during the address portion of the read operation.

4. The circuit claimed in claim 1, further comprising an input circuit, the input circuit transferring a power control value from the second chip to the first chip via the serial interface during a data portion of a write operation.

5. The circuit claimed in claim 1, wherein the analog value represents a temperature.

6. The circuit claimed in claim 1, wherein the analog value represents a radio frequency output power.

7. The circuit claimed in claim 1, wherein the analog value represents a supply voltage.

8. A mobile wireless telecommunication device, comprising:
   a user interface;
   an antenna;
   a baseband subsystem coupled to the user interface, the baseband subsystem including power control logic and serial interface logic defining a serial interface, the serial interface providing a transfer clock signal only during a data transfer operation, the data transfer operation having sequential address and data portions; and
   a radio frequency (RF) subsystem coupled to the baseband subsystem and the antenna, the RF subsystem comprising a transmitter portion and a receiver portion, the transmitter portion comprising a modulator, an upconverter, and a power amplifier system, the power amplifier system comprising:
      a power amplifier;
      an input circuit, the input circuit transferring a power control value from the baseband subsystem to the power amplifier system via the serial interface during a data portion of a write operation;
      a timing circuit, the timing circuit receiving the transfer clock signal from the serial interface logic during a read operation and generating a conversion clock signal in response to the transfer clock signal during an address portion of the read operation;
      an analog-to-digital converter (ADC), the ADC converting an analog value to a digital output in response to the conversion clock signal during the address portion of the read operation; and
      an output circuit, the output circuit transferring the digital output of the ADC to the serial interface logic via the serial interface during a data portion of the read operation.

9. The mobile wireless telecommunication device claimed in claim 8, wherein the analog value represents a temperature.

10. The mobile wireless telecommunication device claimed in claim 8, wherein the analog value represents a radio frequency output power.

11. The mobile wireless telecommunication device claimed in claim 8, wherein the analog value represents a supply voltage.

12. A mobile wireless telecommunication device, comprising:
   a user interface;
   an antenna;
   a baseband subsystem coupled to the user interface, the baseband subsystem including power control logic; and
   a radio frequency (RF) subsystem coupled to the baseband subsystem and the antenna, the RF subsystem comprising a transmitter portion and a receiver portion, the transmitter portion comprising a modulator, an upconverter, a power amplifier system, and serial interface logic defining a serial interface, the serial interface providing a transfer clock signal only during a data transfer operation, the data transfer operation having sequential address and data portions, the power amplifier system comprising:
      a power amplifier;
      an input circuit, the input circuit transferring a power control value from the serial interface logic to the power amplifier system via the serial interface during a data portion of a write operation;
      a timing circuit, the timing circuit receiving the transfer clock signal from the serial interface logic during a read operation and generating a conversion clock signal in response to the transfer clock signal during an address portion of the read operation;
      an analog-to-digital converter (ADC), the ADC converting an analog value to a digital output in response to the conversion clock signal during the address portion of the read operation; and
      an output circuit, the output circuit transferring the digital output of the ADC to the serial interface logic via the serial interface during a data portion of the read operation.

13. The mobile wireless telecommunication device claimed in claim 12, wherein the analog value represents a temperature.

14. The mobile wireless telecommunication device claimed in claim 12, wherein the analog value represents a radio frequency output power.

15. The mobile wireless telecommunication device claimed in claim 12, wherein the analog value represents a supply voltage.

* * * * *